United States Patent
Kobayashi et al.

(10) Patent No.: US 9,522,993 B2
(45) Date of Patent: Dec. 20, 2016

(54) RUBBER COMPOSITION, AND VULCANIZATE AND MOLDED ARTICLE THEREOF

(71) Applicant: DENKI KAGAKU KOGYO KABUSHIKI KAISHA, Tokyo (JP)

(72) Inventors: Naoki Kobayashi, Itoigawa (JP); Yasushi Abe, Itoigawa (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/427,875

(22) PCT Filed: May 30, 2013

(86) PCT No.: PCT/JP2013/065093
§ 371 (c)(1),
(2) Date: Mar. 12, 2015

(87) PCT Pub. No.: WO2014/041856
PCT Pub. Date: Mar. 20, 2014

(65) Prior Publication Data
US 2015/0259520 A1 Sep. 17, 2015

(30) Foreign Application Priority Data
Sep. 13, 2012 (WO) ................. PCT/JP2012/073409

(51) Int. Cl.
| | | |
|---|---|---|
| *C08L 11/00* | (2006.01) | |
| *C08L 23/00* | (2006.01) | |
| *C08L 23/22* | (2006.01) | |
| *C08L 23/16* | (2006.01) | |
| *C08K 3/08* | (2006.01) | |
| *C08K 3/22* | (2006.01) | |

(52) U.S. Cl.
CPC ............... *C08L 23/22* (2013.01); *C08L 11/00* (2013.01); *C08L 23/16* (2013.01); *C08K 2003/0893* (2013.01); *C08K 2003/222* (2013.01); *C08K 2201/003* (2013.01); *C08K 2201/006* (2013.01)

(58) Field of Classification Search
CPC ............. C08L 11/00; C08K 2003/0893; C08K 2003/2217; C08K 3/08; C08K 3/22
See application file for complete search history.

(56) References Cited

U.S. PATENT DOCUMENTS

| | | | | | |
|---|---|---|---|---|---|
| 3,179,718 | A | * | 4/1965 | Wei ..................... | C08K 5/14 524/521 |
| 4,781,979 | A | * | 11/1988 | Wilkus ................ | C08L 7/00 174/110 AR |
| 5,037,360 | A | * | 8/1991 | Fujiwara .............. | C08K 3/08 474/202 |
| 5,140,072 | A | | 8/1992 | Takeshita ............. | 525/215 |
| 6,495,625 | B1 | * | 12/2002 | Abe ..................... | C08K 3/04 524/435 |
| 7,493,917 | B2 | * | 2/2009 | Hirai .................... | F16L 11/081 138/126 |
| 8,530,547 | B2 | * | 9/2013 | Abe ..................... | C08F 36/18 524/106 |
| 2010/0209644 | A1 | | 8/2010 | Abe et al. ............. | 428/36.9 |

FOREIGN PATENT DOCUMENTS

| | | | |
|---|---|---|---|
| JP | 50-87437 A | 12/1973 | |
| JP | 61-106646 A | 5/1986 | |
| JP | 02-034645 A | * 2/1990 | ............. C08L 11/00 |
| JP | 4-272945 A | 9/1992 | |
| JP | 11-43611 A | 2/1999 | |
| JP | 11-323020 A | 11/1999 | |
| JP | 2001-131341 A | 5/2001 | |
| JP | 2002-265689 A | 9/2002 | |
| JP | 2005-60581 A | 3/2005 | |
| JP | 2007-204539 A | 8/2007 | |
| WO | WO 2009/035109 A1 | 3/2009 | |

OTHER PUBLICATIONS

International Search Report dated Jun. 25, 2013, issued to the corresponding International Application No. PCT/JP2013/065093.

* cited by examiner

*Primary Examiner* — Rip A Lee
(74) *Attorney, Agent, or Firm* — Stein IP, LLC

(57) ABSTRACT

Provided are a rubber composition that gives a vulcanizate superior in heat resistance and a vulcanizate and a molded article thereof. A rubber composition, comprising a rubber component consisting of a chloroprene rubber: 50 to 90 mass % and an elastomer: 10 to 50 mass % in a total amount of 100 parts by mass, a zinc powder having an arithmetic mean particle diameter, as determined by the method specified by JIS Z8901, of 3 to 10 μm in an amount of 3 to 20 parts by mass, and a magnesium oxide having a BET specific surface area, as determined by the one-point method specified by JIS Z8830, of 20 to 150 m²/g in an amount of 4 to 16 parts by mass. A vulcanizate and a molded article obtained by molding and vulcanization of the rubber composition.

8 Claims, No Drawings

RUBBER COMPOSITION, AND VULCANIZATE AND MOLDED ARTICLE THEREOF

CROSS-REFERENCE TO RELATED APPLICATIONS

This application is a national stage of International Application No. PCT/JP2013/065093, filed May 30, 2013, which claims the benefit of priority to International Application No. PCT/JP2012/073409, filed Sep. 13, 2012, the disclosures of which are incorporated herein by reference.

TECHNICAL FIELD

The present invention relates to a rubber composition and a vulcanizate and a molded article thereof. More specifically, it relates to a rubber composition containing a chloroprene rubber as rubber component and a vulcanizate and a molded article thereof.

BACKGROUND ART

Chloroprene rubbers, which are superior in mechanical properties, weather resistance, and flame resistance, have been used widely as a material for industrial rubber products. In recent increasing demand for improvement of the properties of industrial rubber products, higher heat resistance is also demanded in addition to the favorable mechanical properties, weather resistance, and flame resistance described above. In particular, automobile rubber parts are exposed during use to significantly higher-temperature environments because of improvement in performance of engine and reduction in size of the body and thus, high heat resistance is required for the rubber products used.

On the other hand, as chloroprene rubbers contain double bonds therein even after vulcanization, they have a disadvantage of low heat resistance. Accordingly, various studies have been in progress to overcome the disadvantage of low heat resistance (see, for example, Patent Documents 1 to 5). For example in the case of the chloroprene rubber composition described in Patent Document 1, zinc powder or zinc powder and water was added to the chloroprene rubber for improvement of the heat resistance.

Alternatively in the case of the rubber compositions described in Patent Documents 2 to 4, carbon black having a LC (average stacking height in the C-axis direction to the crystal-lattice plane) of 2 nm or more and zinc powder or a mixture thereof with a particular plasticizer is added to the chloroprene rubber for improvement of the heat resistance of the vulcanizate. Alternatively in the case of the chloroprene rubber composition described in Patent Document 5, a carbon black having a number-average particle diameter and a DBP oil absorption in particular ranges is added to a xanthogen-modified chloroprene rubber and/or a mercaptan-modified chloroprene rubber for improvement of heat resistance without deterioration in mechanical properties and others.

CITATION LIST

Patent Literatures

[Patent Document 1] JP-A No. S50-87437
[Patent Document 2] JP-A No. H11-323020
[Patent Document 3] JP-A No. 2001-131341
[Patent Document 4] JP-A No. 2005-60581

SUMMARY OF INVENTION

Technical Problem

However, although these conventional rubber compositions described in Patent Documents 1 to 5 described above can be used without any problem under normal use environments, they are less heat-resistant, when compared with rubber compositions containing a high-heat resistant rubber such as butyl rubber (IIR) or ethylene-propylene-diene ternary copolymer (EPDM). Thus, these conventional rubber compositions may not satisfy requirements when they are used in applications of automobile rubber parts where the requirement level for heat resistance is higher, and use of them in applications demanding high heat resistance such as tire bladder is practically impossible.

Accordingly, a major object of the present invention is to provide a rubber composition that gives a vulcanizate superior in heat resistance and a vulcanizate and a molded article thereof.

Solution to Problem

The rubber composition according to the present invention comprises a rubber component consisting of a chloroprene rubber: 50 to 90 mass % and an elastomer: 10 to 50 mass % in a total amount of 100 parts by mass, a zinc powder having an arithmetic mean particle diameter, as determined by the method specified by JIS Z8901, of 3 to 10 μm in an amount of 3 to 20 parts by mass, and a magnesium oxide having a BET specific surface area, as determined by the one-point method specified by JIS Z8830, of 20 to 150 $m^2/g$ in an amount of 4 to 16 parts by mass.

The elastomer used in the rubber composition may be, for example, at least one polymer selected from the group consisting of ethylene-α-olefin copolymers, ethylene-α-olefin-unconjugated polyene copolymers, and butyl rubbers.

Alternatively, the chloroprene rubber for use may be, for example, a mercaptan- or xanthogen-modified chloroprene rubber.

On the other hand, the rubber composition may additionally comprise at least one antioxidant agent selected from aromatic amine-based antioxidant agents, hindered phenol-based antioxidant agents, and phosphite-based antioxidant agents in a total amount of 3 to 10 parts by mass with respect to 100 parts by mass of the rubber component.

It may additionally comprise an acetylene black having a nitrogen-adsorption specific surface area ($N_2SA$) of 50 to 160 $m^2/g$ in an amount of 10 to 50 parts by mass with respect to 100 parts by mass of the rubber component.

Further, it may additionally comprise at least one softener selected from the group consisting of vegetable oil-based softeners, ether/ester-based plasticizers, phthalate ester-based plasticizers, adipate ester-based plasticizers, dibasic aliphatic acid ester-based plasticizers, phosphate ester-based plasticizers, citrate ester-based plasticizers, and petroleum aromatic process oils in an amount of 5 to 20 parts by mass with respect to 100 parts by mass of the rubber component.

The vulcanizate according to the present invention is that prepared by vulcanization of the rubber composition described above.

The molded article according to the present invention is made of the vulcanizate described above.

Advantageous Effects of Invention

Because the rubber component according to the present invention comprises a particular amount of an elastomer and additionally a particular zinc powder and a particular magnesium oxide, it is possible to provide a vulcanizate significantly improved in heat resistance without deterioration in permanent compression set.

DESCRIPTION OF EMBODIMENTS

Hereinafter, favorable embodiments of the invention will be described in detail. It should be understood that the present invention is not limited to the embodiments below.

First Embodiment

First, a rubber composition in the first embodiment of the present invention will be described. The rubber composition of the present embodiment is a blend rubber containing a chloroprene rubber and an elastomer as rubber component, which contains additionally a particular zinc powder and a particular magnesium oxide. The rubber composition of the present embodiment may contain an antioxidant agent, a carbon black, a softener, a filler, and others in addition to the components described above.

[Chloroprene Rubber]

The chloroprene rubber constituting the rubber component, which is prepared by polymerizing raw monomers containing chloroprene as the major component and, as needed, cleaning and drying the resulting polymer, may contain, in addition to the reaction product of polymerization, i.e., a chloroprene homopolymer or a copolymer of chloroprene with other monomers, an emulsifier, a dispersant, catalyst, a catalyst-activating agent, a chain-transfer agent, a polymerization inhibitor, and others added during polymerization.

Examples of the monomers copolymerizable with chloroprene include acrylate esters such as methyl acrylate, butyl acrylate, and 2-ethylhexyl acrylate; methacrylate esters such as methyl methacrylate, butyl methacrylate, and 2-ethylhexyl methacrylate; hydroxy (meth)acrylates such as 2-hydroxyethyl (meth)acrylate, 2-hydroxymethyl (meth)acrylate, and 2-hydroxypropyl (meth)acrylate; 2,3-dichloro-1,3-butadiene, 1-chloro-1,3-butadiene, butadiene, isoprene, ethylene, styrene, acrylonitrile, and the like.

The monomer to be copolymerized with chloroprene is not limited to a single monomer and, for example, a combination of three or more monomers including chloroprene may be used. The polymer structure of the chloroprene polymer is also not particularly limited.

Chloroprene rubbers are grouped into sulfur-modified chloroprene rubbers and non-sulfur-modified chloroprene rubbers, and the non-sulfur-modified chloroprene rubbers are further grouped into mercaptan- and xanthogen-modified chloroprene rubbers, according to the kind of the molecular weight adjustor used. The sulfur-modified chloroprene rubbers are those obtained by copolymerizing raw monomers containing chloroprene as the major component with sulfur and adjusting the Mooney viscosity of the resulting copolymer to a particular value by plasticizing it with thiuram disulfide.

On the other hand, the mercaptan-modified chloroprene rubbers are obtained by using an alkylmercaptan such as n-dodecylmercaptan, tert-dodecylmercaptan, or octylmercaptan as the molecular weight adjustor. Alternatively, the xanthogen-modified chloroprene rubbers are obtained by using an alkylxanthogen compound as the molecular weight adjustor. The chloroprene rubber blended to the rubber composition of the present embodiment may be any one of the various chloroprene rubbers described above, but a non-sulfur-modified chloroprene rubber such as a mercaptan- or xanthogen-modified chloroprene rubber is particularly favorable.

Further, chloroprene rubbers can be grouped, for example, into slow-, medium-, and rapid-crystallization rubbers, based on crystallization rate. Any one of the above-described types of chloroprene rubbers may be used in the rubber composition of the present embodiment and the chloroprene rubber is used, as selected properly according to application and others.

The method for producing the chloroprene rubber is not particularly limited, and it may be prepared by polymerizing raw monomers by an emulsion polymerization method generally used, in the presence of an emulsifier, a polymerization initiator, a molecular weight adjustor, and others. The emulsifier for use then may be an emulsifier commonly used for emulsion polymerization of chloroprene, and examples thereof include alkali-metal salts of saturated and unsaturated aliphatic acids having 6 to 22 carbon atoms, alkali-metal salts of rosin acids and disproportioned rosin acids, and alkali-metal salts of 6-naphthalenesulfonic acid-formalin condensates.

Alternatively, the polymerization initiator for use may be a known polymerization initiator commonly used for emulsion polymerization of chloroprene and it is, for example, an organic peroxide such as potassium persulfate, ammonium persulfate, sodium persulfate, hydrogen peroxide, or tert-butyl hydroperoxide.

The polymerization temperature during emulsion polymerization is not particularly limited, but preferably 0 to 50° C., more preferably 20 to 50° C. from the viewpoints of productivity and polymerization stability. The final monomer conversion rate is also not particularly limited, but preferably in the range of 60 to 90% from the viewpoint of productivity.

The polymerization reaction is terminated by addition of a small amount of a polymerization inhibitor to the polymerization liquid when the final conversion rate reaches a particular range and the polymerization inhibitor for use then may be a compound commonly used such as thiodiphenylamine, 4-tert-butylcatechol, or 2,2-methylene bis-4-methyl-6-tert-butylphenol. After the polymerization reaction, it is possible to obtain the polymer by removing unreacted monomers, for example, by steam stripping method, adjusting the pH of the latex, and isolating the polymer by a common method such as freezing solidification, water washing, or hot-air drying.

[Elastomer]

The elastomer is blended for improvement of the heat resistance of the rubber composition. The elastomer blended to the rubber composition of the present embodiment is not particularly limited, but preferably an ethylene-α-olefin copolymer, an ethylene-α-olefin-unconjugated polyene copolymer, or a butyl rubber. It is thus possible to improve the heat resistance of the rubber composition further. These elastomers may be used alone or in combination of two or more.

The α-olefin in the ethylene-α-olefin copolymer or the ethylene-α-olefin-unconjugated polyene copolymer is not particularly limited, but preferably an α-olefin having a carbon number of 3 to 20 from the viewpoint of processability. Examples of the α-olefins having a carbon number of 3 to 20 include propylene, 1-butene, 1-pentene, 1-hexene, 1-heptene, 1-octene, 1-decene, and the like.

Among these α-olefins, propylene, 1-butene, 1-hexene, and 1-octene are preferable, and propylene is particularly preferable, from the viewpoint of the balance between processability and physical properties including heat resistance. The α-olefin in the ethylene-α-olefin copolymer or the ethylene-α-olefin-unconjugated polyene copolymer is not limited to a single compound and thus, two or more α-olefins may be copolymerized.

Examples of the unconjugated polyenes constituting the ethylene-α-olefin-unconjugated polyene copolymer include cyclic polyenes such as 5-ethylidene-2-norbornene, dicyclopentadiene, 5-propylidene-2-norbornene, 5-vinyl-2-norbornene, 2,5-norbornadiene, 1,4-cyclohexadiene, 1,4-cyclooctadiene, and 1,5-cyclooctadiene; linear polyenes having 6 to 15 carbon atoms containing internal unsaturated bonds such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,6-octadiene, 7-methyl-1,6-octadiene, 5,7-dimethyl-1,6-octadiene, 7-methyl-1,7-nonadiene, 8-methyl-1,7-nonadiene, 8-methyl-1,8-decadiene, 9-methyl-1,8-decadiene, 4-ethylidene-1,6-octadiene, 7-methyl-4-ethylidene-1,6-octadiene, 7-methyl-4-ethylidene-1,6-nonadiene, 7-ethyl-4-ethylidene-1,6-nonadiene, 6,7-dimethyl-4-ethylidene-1,6-octadiene, and 6,7-dimethyl-4-ethylidene-1,6-nonadiene; α,ω-dienes such as 1,5-hexadiene, 1,6-heptadiene, 1,7-octadiene, 1,8-nonadiene, 1,9-decadiene, 1,10-undecadiene, 1,11-dodecadiene, 1,12-tridecadiene, and 1,13-tetradecadiene; and the like.

Among these unconjugated polyenes, 5-ethylidene-2-norbornene, dicyclopentadiene, 5-vinyl-2-norbornene, 7-methyl-1,6-octadiene, and 5-methyl-1,4-hexadiene are preferable and 5-ethylidene-2-norbornene is particularly preferable from the viewpoint of crosslinking efficiency. The unconjugated polyene constituting ethylene-α-olefin-unconjugated polyene copolymer is not limited to a single compound and two or more unconjugated polyenes may be copolymerized.

The ethylene-α-olefin copolymer and the ethylene-α-olefin-unconjugated polyene copolymer described above can be prepared by copolymerizing ethylene, α-olefin, and unconjugated polyene by a known method such as gas phase polymerization method, solution polymerization method, or slurry polymerization method.

Alternatively, examples of the butyl-based rubbers include butyl rubbers, halogenated butyl rubbers, and brominated isobutylene-p-methylstyrene. For example, the halogenated butyl rubber for use may be a chlorinated butyl rubber (Cl-IIR) or a brominated butyl rubber (Br-IIR). The butyl-based rubber to be blended to the rubber composition of the present embodiment is not limited to a single rubber and two or more butyl-based rubbers may be used, as blended.

[Chloroprene Rubber:Elastomer (50:50 to 90:10)]

When the content of the elastomer in the rubber component is less than 10 mass %, it is not possible to improve the heat resistance of the rubber composition sufficiently and, when the elastomer content is more than 50 mass %, the resulting composition becomes less compatible with the chloroprene rubber, making it difficult to vulcanize the rubber composition. Thus, the blending rate of the elastomer in the rubber composition of the present embodiment is 10 to 50 mass % with respect to the total mass of the rubber component.

As the rubber component other than the elastomer in the rubber composition of the present embodiment is a chloroprene rubber, the blending rate of the chloroprene rubber is 50 to 90 mass % with respect to the total mass of the rubber component. The method of mixing the chloroprene rubber with the elastomer is not particularly limited, and these ingredients may be mixed, for example, using a roll, a Banbury mixer, or an extruder.

[Zinc Powder: 3 to 20 Parts by Mass with Respect to 100 Parts by Mass of Rubber Component]

Zinc powder has an action to improve further the heat resistance of the rubber composition synergically with the elastomer blended as rubber component and magnesium oxide described below. However when the zinc powder has an arithmetic mean particle diameter of less than 3 μm, it may not be dispersed favorably in the rubber composition and, when it has an arithmetic mean particle diameter of more than 10 μm, it may not be possible to have the action to improve heat resistance. The arithmetic mean particle diameter of the zinc powder can be determined by the transmission electron or transmission optical microscopy specified by JIS Z8901: 2006.

When the blending rate of the zinc powder is less than 3 parts by mass with respect to 100 parts by mass of the rubber component, it is not possible to obtain the action to improve the heat resistance and, when it is added in an amount of more than 20 parts by mass, the improvement in heat resistance becomes saturated and the rubber composition has a higher specific gravity, leading to increase in product cost. Thus in the rubber composition of the present embodiment, zinc powder having an arithmetic mean particle diameter, as determined by the method specified by JIS Z8901, of 3 to 10 μm is blended in an amount in the range of 3 to 20 parts by mass with respect to 100 parts by mass of the rubber component.

[Magnesium Oxide: 4 to 16 Parts by Mass with Respect to 100 Parts by Mass of Rubber Component]

Magnesium oxide has an action to improve drastically the heat resistance of the rubber composition, synergically with the elastomer blended as rubber component and zinc powder described above. However when the magnesium oxide has a BET specific surface area of less than 20 $m^2/g$, it may not be possible to obtain desirable mechanical strength when the rubber composition is converted to a vulcanizate or a molded article. Alternatively, use of a magnesium oxide having a BET specific surface area of more than 150 $m^2/g$ leads to deterioration of the heat resistance-improving effect.

The BET specific surface area described above is a value determined by the one-point method specified by JIS Z8830. The BET method is a method of determining the specific surface area of a sample powder by making the powder particle absorb a gas having a known occupancy area (normally, $N_2$ gas) on the surface and determining the amount of the gas absorbed. The specific surface area determined by the method is called "BET specific surface area" and, in the case of magnesium oxide, a higher BET specific surface area indicates that it is more active.

When the amount of magnesium oxide blended is less than 4 parts by mass with respect to 100 parts by mass of the rubber component, the rubber composition does not have improved heat resistance and, when magnesium oxide is blended in an amount of more than 16 parts by mass, the action to improve heat resistance may be lowered, for example, by vulcanization inhibition. Thus in the rubber composition of the present embodiment, a magnesium oxide having a BET specific surface area in the range of 20 to 150 $m^2/g$ is blended in an amount of 4 to 16 parts by mass with respect to 100 parts by mass of the rubber component.

[Antioxidant Agent: 3 to 10 Parts by Mass with Respect to 100 Parts by Mass of Rubber Component]

An antioxidant agents has an action to prevent degradation of the chloroprene rubber and the elastomer, which are blended as rubber components, by ozone or heat. Examples of the antioxidant agents include aromatic amine-based antioxidant agents, hindered phenol-based antioxidant agents, phosphite-based antioxidant agents, and the like.

In the rubber composition of the present embodiment, one or more antioxidant agents selected from aromatic amine-, hindered phenol- and phosphite-based antioxidant agents are added, as needed, in an amount in the range of 3 to 10 parts by mass with respect to 100 parts by mass of the rubber component. When the amount of the antioxidant agent blended is less than 3 parts by mass with respect to 100 parts by mass of the rubber component, it may not be possible to obtain antioxidant effects of the chloroprene rubber sufficiently. Alternatively when the antioxidant agent is blended in an amount of more than 10 parts by mass with respect to 100 parts by mass of the rubber component, the vulcanization may be inhibited and the antioxidant agent may bleed out, causing deterioration in various physical properties including heat resistance and also causing product defects when the rubber composition is processed into a vulcanizate or a molded article.

Examples of the aromatic amine-based antioxidant agents include N-phenyl-1-naphthylamine, alkylated diphenylamines, octylated diphenylamines, 4,4'-bis(α,α-dimethylbenzyl)diphenylamine, p-(p-toluenesulfonylamide)diphenylamine, N,N'-di-2-naphthyl-p-phenylenediamine, N,N'-diphenyl-p-phenylenediamine, N-phenyl-N'-isopropyl-p-phenylenediamine, N-phenyl-N'(1,3-dimethylbutyl)-p-phenylenediamine, N-phenyl-N-(3-methacryloyloxy-2-hydroxypropyl)-p-phenylenediamine, and the like. These antioxidant agents may be used in combination of two or more.

Examples of the hindered phenol-based antioxidant agents include 1,1,3-tris-(2-methyl-4-hydroxy-5-tert-butylphenyl)butane, 4,4'-butylidene bis-(3-methyl-6-tert-butylphenol), 2,2-thiobis(4-methyl-6-tert-butylphenol), 7-octadecyl-3-(4'-hydroxy-3',5'-di-tert-butylphenyl)propionate, tetrakis-[methylene-3-3',5'-di-tert-butyl-4'-hydroxyphenyl) propionate]methane, pentaerythritol-tetrakis[3-(3,5-di-tert-butyl-4-hydroxyphenyl)propionate], triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], 2,4-bis(n-octylthio)-6-(4-hydroxy-3,5-di-tert-butylanilino)-1,3,5-triazine, tris-(3,5-di-tert-butyl-4-hydroxybenzyl)-isocyanurate, 2,2-thio-diethylene bis[3-(3,5-di-tert-butyl-4-hydroxyphenyl)propionate], N,N'-hexamethylene bis(3,5-di-tert-butyl-4-hydroxy)-hydrocinnamide, 2,4-bis[(octylthio)methyl]-o-cresol, 3,5-di-tert-butyl-4-hydroxybenzyl-phosphonate diethylester, tetrakis[methylene(3,5-di-tert-butyl-4-hydroxyhydrocinnamate)]methane, octadecyl-3-(3,5-di-tert-butyl-4-hydroxyphenyl)propionate ester, 3,9-bis[2-{3-(3-tert-butyl-4-hydroxy-5-methylphenyl)propionyloxy}-1,1-dimethylethyl]-2,4-8,10-tetraoxaspiro[5.5]undecane, and the like. These antioxidant agents may be used in combination of two or more.

Examples of the phosphite-based antioxidant agent include tris(nonyl-phenyl) phosphite, tris(mixing mono- and di-nonylphenyl) phosphite, diphenyl-mono(2-ethylhexyl) phosphite, diphenyl-monotridecyl-phosphite, diphenyl-isodecyl-phosphite, diphenyl-isooctyl-phosphite, diphenyl-nonylphenyl-phosphite, triphenyl phosphite, tris(tridecyl) phosphite, triisodecyl phosphite, tris(2-ethylhexyl) phosphite, tris(2,4-di-tert-butylphenyl) phosphite, tetraphenyl dipropylene glycol-diphosphite, tetraphenyltetra(tridecyl) pentaerythritol tetraphosphite, 1,1,3-tris(2-methyl-4-di-tridecylphosphite-5-tert-butylphenyl)butane, 4,4'-butylidene bis(3-methyl-6-tert-butyl-di-tridecyl phosphite), 2,2'-ethylidene bis(4,6-di-tert-butylphenol)fluorophosphite, 4,4'-isopropylidene-diphenol alkyl ($C_{12}$ to $C_{15}$) phosphites, cyclic neopentane tetrayl bis(2,4-di-tert-butylphenylphosphite), cyclic neopentane tetrayl bis(2,6-di-tert-butyl-4-phenylphosphite), cyclic neopentane tetrayl bis(nonylphenylphosphite), bis(nonylphenyl)pentaerythritol diphosphite, dibutyl hydrogen phosphite, distearyl-pentaerythritol-diphosphite, hydrogenated bisphenol A-pentaerythritol phosphite polymers, and the like. These antioxidant agents may be used in combination of two or more.

[Carbon Black: 10 to 50 Parts by Mass with Respect to 100 Parts by Mass of Rubber Component]

Carbon black has an action to reinforce the vulcanizates and the molded articles obtained by vulcanization of the rubber composition and thus making them stronger. The kind of the carbon black blended to the rubber composition of the present embodiment is not particularly limited, but use of an acetylene black having a nitrogen-adsorption specific surface area ($N_2SA$) of 50 to 160 $m^2/g$ is desirable for improvement of heat resistance.

However, when the amount of the carbon black blended is less than 10 parts by mass with respect to 100 parts by mass of the rubber component, the vulcanizates obtained by vulcanization of the rubber composition may not be reinforced effectively and may not have sufficient practical performance for use as a drive belt or an automobile part. Alternatively when the amount of the carbon black blended is more than 50 parts by mass with respect to 100 parts by mass of the rubber component, the heat resistance of the rubber composition may decline drastically. Thus, an acetylene black having a nitrogen-adsorption specific surface area ($N_2SA$) of 50 to 160 $m^2/g$ is added, as needed, to the rubber composition of the present embodiment, in an amount in the range of 10 to 50 parts by mass with respect to 100 parts by mass of the rubber component.

[Softener: 5 to 20 Parts by Mass with Respect to 100 Parts by Mass of Rubber Component]

The rubber composition of the present embodiment may contain one or more softeners selected from vegetable oil-based softeners, ether/ester-based plasticizers, phthalate ester-based plasticizers, adipate ester-based plasticizers, dibasic aliphatic acid ester-based plasticizers, phosphate ester-based plasticizers, citrate ester-based plasticizers, and petroleum aromatic process oils.

The amount of the softeners blended is not particularly limited and can be modified properly according to the hardness required, but for further improvement of heat resistance, it is preferably 5 to 20 parts by mass with respect to 100 parts by mass of the rubber component. It is thus possible to improve heat resistance and also adjust the hardness of the vulcanizate and the molded article obtained by vulcanization of the rubber composition.

[Other Components]

The rubber composition of the present embodiment may contain silica and a silane-coupling agent in addition to the components described above. Addition of silica and the silane-coupling agent improves the dynamic low-heat-buildup property of the rubber composition obtained. The silica blended to the rubber composition of the present embodiment is not particularly limited and, for example can be selected arbitrarily from those that can be used as a reinforcement filler for rubbers including wet silica, dry silica, and colloidal silica.

The amount of the silica blended is preferably 50 parts by mass or less with respect to 100 parts by mass of the rubber component. When the amount of the silica blended is more than 50 parts by mass, it may not be possible to obtain sufficient improvement in heat resistance of the rubber composition obtained. On the other hand, the amount of the silane-coupling agent blended is preferably 0.5 to 25 parts by mass with respect to 100 parts by mass of silica. It is possible to improve the dynamic low-heat-buildup property efficiently without deterioration in heat resistance by controlling the blending amount of the silane-coupling agent in the range above.

The silane-coupling agent blended to the rubber composition of the present embodiment is not particularly limited if it does not have adverse effect, for example, on vulcanization, and examples thereof include bis-(3-triethoxysilylpropyl)tetrasulfide, bis-(3-trimethoxysilylpropyl)tetrasulfide, bis-(3-methyldimethoxysilylpropyl)tetrasulfide, bis-(2-triethoxysilylethyl)tetrasulfide, bis-(3-triethoxysilylpropyndisulfide, bis-(3-trimethoxysilylpropyl) disulfide, bis-(3-triethoxysilylpropyl)trisulfide, 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, 3-mercaptopropyltrimethoxysilane, 3-mercaptopropyltriethoxysilane, 3-mercaptopropylmethyldimethoxysilane, 3-aminopropyltrimethoxysilane, 3-aminopropyltriethoxysilane, γ-glycidoxypropyltrimethoxysilane, γ-glycidoxy propylmethyldiethoxysilane, 3-trimethoxysilylpropyl-N,N-dimethylthiocarbamoyltetrasulfide, 3-trimethoxysilylpropylbenzothiazolyltetrasulfide, 3-trimethoxysilylpropylmethacryloyl monosulfide, and the like. These silane-coupling agents may be used alone or in combination of two or more.

In addition, the rubber composition of the present embodiment may contain an inorganic filler other than silica. Typical examples thereof for use include aluminas ($Al_2O_3$) such as γ-alumina and α-alumina; alumina monohydrates ($Al_2O_3$—$H_2O$) such as boehmite and diaspore; aluminum hydroxides [$Al(OH)_3$] such as gibbsite and bayerite; aluminum carbonate [$Al_2(CO_3)_2$], magnesium hydroxide [$Mg(OH)_2$], magnesium carbonate ($MgCO_3$), talc ($3MgO\cdot4SiO_2$—$H_2O$), attapulgite ($5MgO\cdot8SiO_2\cdot9H_2O$), titanium white ($TiO_2$), titanium black ($TiO_{2n-1}$), calcium oxide (CaO), calcium hydroxide [$Ca(OH)_2$], aluminum magnesium oxide (MgO—$Al_2O_3$), clay ($Al_2O_3\cdot2SiO_2$), kaolin ($Al_2O_3\cdot2SiO_2\cdot2H_2O$), pyrophyllite ($Al_2O_3\cdot4SiO_2$—$H_2O$), bentonite ($Al_2O_3\cdot4SiO_2\cdot2H_2O$), aluminum silicates (such as $Al_2SiO_5$ and $Al_4\cdot3SiO_4\cdot5H_2O$), magnesium silicates (such as $Mg_2SiO_4$ and $MgSiO_3$), calcium silicates (such as $Ca_2SiO_4$), aluminum calcium silicates (such as $Al_2O_3$—CaO·$2SiO_2$), magnesium calcium silicate ($CaMgSiO_4$), calcium carbonate ($CaCO_3$), zirconium oxide ($ZrO_2$), zirconium hydroxide [$ZrO(OH)_2\cdot nH_2O$], zirconium carbonate [$Zr(CO_3)_2$], crystalline aluminosilicate salts containing charge-compensating hydrogen atoms and alkali or alkali-earth metals such as various zeolites, and the like.

In addition, the rubber composition of the present embodiment may contain additionally various chemicals commonly used in the rubber industry, including vulcanizing agents, vulcanization accelerators, antiscorching agents, and processing aids in an amount in the range that does not impair the favorable effects described above.

The rubber composition of the present embodiment can be prepared by a method similar to that used for preparation of common rubbers. Specifically, it is obtained by kneading rubber components (chloroprene rubber, elastomer), zinc powder, magnesium oxide, and other components by means of a kneading machine such as kneader, Banbury mixer, or roll at a temperature not higher than the vulcanization temperature.

As described above in detail, the rubber composition of the present embodiment, which contains a particular amount of an elastomer as rubber component, a particular zinc powder, and a particular magnesium oxide, shows heat resistance significantly improved without deterioration of the permanent compression set of the chloroprene rubber. It is thus possible to obtain a chloroprene-based rubber composition that gives vulcanizates superior in heat resistance.

Second Embodiment

Hereinafter, a vulcanizate in the second embodiment of the present invention will be described. The vulcanizate of the present embodiment is produced by molding and vulcanizing the rubber composition of the first embodiment described above into a desired shape. The method of vulcanizing the rubber composition then is not particularly limited and the rubber composition may be vulcanized, during or after molding, for example by a vulcanization method such as press vulcanization, injection vulcanization, direct tank vulcanization, indirect tank vulcanization, direct-vapor continuous vulcanization, normal-pressure continuous vulcanization or continuous vulcanizing press.

In addition, the vulcanization conditions such as vulcanization temperature and vulcanizing time are also not particularly limited and can be determined arbitrarily, but the vulcanization temperature is preferably 130 to 200° C., more preferably 140 to 190° C., from the viewpoints of productivity and processing stability. The "processing stability," as used herein, is an indicator of processability evaluated by scorch time, and it has a significant influence on the defect rate of the vulcanizate. Specifically, short scorch time leads to vulcanization of unvulcanized rubber component during molding at high temperature and thus to increase of the molding defect rate.

As the vulcanizate of the present embodiment contains the rubber composition of the first embodiment described above, it is shows heat resistance significantly improved from that of the vulcanizates prepared from a conventional chloroprene rubber. Thus, the vulcanizate of the present embodiment can be used favorably not only as a seismic isolation rubber or sponge, but also as a molded article demanding high heat resistance such as drive belt, conveyor belt, air spring, automobile hose, automobile boot, antivibration rubber, or bladder product.

EXAMPLES

Hereinafter, advantageous effects of the present invention will be described with reference to Examples and Comparative Examples of the present invention. It should be understood that the present invention is not restricted by these Examples. In the Examples below, respective components were blended in the composition shown in the following Tables 1 and 2 and the mixtures were kneaded with an 8 inch roll, to give the rubber compositions of Examples and Comparative Examples. The rubber compositions of Examples and Comparative Examples were then vulcanized and the properties thereof were evaluated.

TABLE 1

| | | | | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Blending composition (part by mass) | Rubber component | Chloroprene rubber | Mercaptan-modified chloroprene rubber | 70 | 50 | 90 | — | — | 70 | 70 | 70 | 70 | 70 |
| | | | Xanthogen-modified chloroprene rubber | — | — | — | 70 | — | — | — | — | — | — |
| | | | Sulfur-modified chloroprene rubber | — | — | — | — | 70 | — | — | — | — | — |
| | | Elastomer | Ethylene-propylene rubber | 30 | 50 | 10 | 30 | 30 | — | — | 30 | 30 | 30 |
| | | | Ethylene-propylene-diene rubber | — | — | — | — | — | 30 | — | — | — | — |
| | | | Butyl-based rubber | — | — | — | — | — | — | 20 | — | — | — |

TABLE 1-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| Carbon black | Acetylene black | 25 | 25 | 25 | 25 | 25 | 25 | 25 | — | 25 | 25 |
| | Carbon Black GPF | — | — | — | — | — | — | — | 25 | — | — |
| Plasticizer | Rape-seed oil | 5 | 5 | 5 | 5 | 5 | 5 | 5 | 5 | 5 | 5 |
| Lubricant/processing aid | Stearic acid | 1 | 1 | 1 | 1 | 1 | 1 | 1 | 1 | 1 | 1 |
| Antioxidant agent | Amine-based antioxidant agent | 3 | 3 | 3 | 3 | 3 | 3 | 3 | 3 | 3 | 3 |
| | Hindered phenol-based antioxidant agent | 1 | 1 | 1 | 1 | 1 | 1 | 1 | 1 | 1 | 1 |
| | Phosphite-based antioxidant agent | 1 | 1 | 1 | 1 | 1 | 1 | 1 | 1 | 1 | 1 |
| Magnesium oxide | Magnesium oxide #30 | 8 | 8 | 8 | 8 | 8 | 8 | 8 | 8 | 8 | 8 |
| | Magnesium oxide #150 | — | — | — | — | — | — | — | — | — | — |
| Zinc powder | Zinc powder A | 10 | 10 | 10 | 10 | 10 | 10 | 10 | 10 | — | 20 |
| | Zinc powder B | — | — | — | — | — | — | — | — | — | — |
| | Zinc powder C | — | — | — | — | — | — | — | — | 10 | — |
| Vulcanization accelerator | Thiourea-based vulcanization accelerator | 1.2 | 1.2 | 1.2 | 1.2 | 1.2 | 1.2 | 1.2 | 1.2 | 1.2 | 1.2 |
| | Zinc oxide | 5 | 5 | 5 | 5 | 5 | 5 | 5 | 5 | 5 | 5 |

TABLE 2

| | | | | Example | | | Comparative Example | | | | | | |
|---|---|---|---|---|---|---|---|---|---|---|---|---|---|
| | | | | 11 | 12 | 13 | 1 | 2 | 3 | 4 | 5 | 6 | 7 |
| Blending composition (part by mass) | Rubber component | Chloroprene rubber | Mercaptan-modified chloroprene rubber | 70 | 70 | 70 | 40 | 100 | 70 | 70 | 70 | 70 | 70 |
| | | | Xanthogen-modified chloroprene rubber | — | — | — | — | — | — | — | — | — | — |
| | | | Sulfur-modified chloroprene rubber | — | — | — | — | — | — | — | — | — | — |
| | | Elastomer | Ethylene-propylene rubber | 30 | 30 | 30 | 60 | 0 | 30 | 30 | 30 | 30 | 30 |
| | | | Ethylene-propylene-diene rubber | — | — | — | — | — | — | — | — | — | — |
| | | | Butyl-based rubber | — | — | — | — | — | — | — | — | — | — |
| | Carbon black | | Acetylene black | 25 | 25 | 25 | 25 | 25 | 25 | 25 | 25 | 25 | 25 |
| | | | Carbon Black GPF | — | — | — | — | — | — | — | — | — | — |
| | Plasticizer | | Rape-seed oil | 5 | 5 | 5 | 5 | 5 | 5 | 5 | 5 | 5 | 5 |
| | Lubricant/processing aid | | Stearic acid | 1 | 1 | 1 | 1 | 1 | 1 | 1 | 1 | 1 | 1 |
| | Antioxidant agent | | Amine-based antioxidant agent | 3 | 3 | 3 | 3 | 3 | 3 | 3 | 3 | 3 | 3 |
| | | | Hindered phenol-based antioxidant agent | 1 | 1 | 1 | 1 | 1 | 1 | 1 | 1 | 1 | 1 |
| | | | Phosphite-based antioxidant agent | 1 | 1 | 1 | 1 | 1 | 1 | 1 | 1 | 1 | 1 |
| | Magnesium oxide | | Magnesium oxide #30 | 8 | 16 | — | 8 | 8 | 8 | 8 | 8 | 2 | 20 |
| | | | Magnesium oxide #150 | — | — | 4 | — | — | — | — | — | — | — |
| | Zinc powder | | Zinc powder A | 5 | 10 | 10 | 10 | 10 | — | 2 | 30 | 10 | 10 |
| | | | Zinc powder B | — | — | — | — | — | 10 | — | — | — | — |
| | | | Zinc powder C | — | — | — | — | — | — | — | — | — | — |
| | Vulcanization accelerator | | Thiourea-based vulcanization accelerator | 1.2 | 1.2 | 1.2 | 1.2 | 1.2 | 1.2 | 1.2 | 1.2 | 1.2 | 1.2 |
| | | | Zinc oxide | 5 | 5 | 5 | 5 | 5 | 5 | 5 | 5 | 5 | 5 |

Respective components in the compositions shown in Tables 1 and 2 are as follows:
(Rubber Component)
Mercaptan-modified chloroprene rubber (M-40, produced by Denki Kagaku Kogyo K.K.)
Xanthogen-modified chloroprene rubber (DCR-66, produced by Denki Kagaku Kogyo K.K.)
Sulfur-modified chloroprene rubber (DCR-40A, produced by Denki Kagaku Kogyo K.K.)
Ethylene-propylene rubber (ESPRENE 201, produced by Sumitomo Chemical Co. Ltd.)
Ethylene-propylene-diene rubber (EPT 4045M, produced by Mitsui Chemicals, Inc.)
Butyl-based rubber (JSR BUTYL 268, produced by JSR Corp.)
(Carbon Black)
Acetylene black (Denka Black powder, produced by Denki Kagaku Kogyo K.K.)
Carbon Black GPF (Asahi #55, produced by Asahi Carbon Co., Ltd.)
(Plasticizer)
Rape-seed oil (#8115-R, produced by Toei Chemical Co., Ltd.)
(Lubricant/Processing Aid)
Stearic acid (Stearic acid 50S, produced by New Japan Chemical Co., Ltd.)
(Antioxidant Agent)
Amine-based antioxidant agent (Nocrack CD: 4,4-bis(α,α-dimethylbenzyl)diphenylamine, produced by Ouchi Shinko Chemical Industrial Co., Ltd.)
Hindered phenol-based antioxidant agent (IRGANOX 1010: pentaerythritol tetrakis[3-(3,5-di-tert-butyl-4-hydroxyphenyl)propionate, produced by BASF Japan)
Phosphite-based antioxidant agent (Nocrack TNP: tris(nonylphenyl)phosphite, produced by Ouchi Shinko Chemical Industrial Co., Ltd.)

(Magnesium Oxide)
Magnesium oxide #30 (KYOWA MAG 30 produced by Kyowa Chemical Industry Co., Ltd. (BET specific surface area: 40 m$^2$/g))
Magnesium oxide #150 (KYOWA MAG 150, produced by Kyowa Chemical Industry Co., Ltd. (BET specific surface area: 148 m$^2$/g))
(Zinc Powder)
Zinc powder A (zinc powder #F, produce by Sakai Chemical Industry Co., Ltd. (average diameter: 3.8 μm))
Zinc powder B (AN-325, produced by Toho Zinc Co., Ltd. (average diameter: 18 μm))
Zinc powder C (R powder, produced by Hakusui Tech Co., Ltd. (average diameter: 7 μm))
(Vulcanization Accelerator)
Thiourea-based vulcanization accelerator (Accel 22S: ethylene thiourea, produced by Kawaguchi Chemical Industry Co., Ltd.)
Zinc oxide (mixture of two kinds of zinc oxides produced by Sakai Chemical Industry Co., Ltd.)
<Evaluation>

Each of the rubber compositions of Examples 1 to 13 and Comparative Examples 1 to 7 prepared by the method described above was vulcanized by means of an oil hydraulic press at 160° C. for 20 minutes, to give a test specimen. The "elongation at break (EB)," the "hardness (HS)," and the "heat resistance" of the test specimen were then evaluated.

The "elongation at break (EB)" was determined according to JIS K6251. Alternatively, the "hardness (HS)" was determined according to JIS K6253, using a durometer hardness tester. Yet alternatively, the "heat resistance" was evaluated from the results of the elongation-at-break measurements after the test specimen was stored in a Geer oven at 160° C. for 48 hours, 96 hours, and 144 hours.

Alternatively, the "permanent compression set" was evaluated, using a test specimen obtained by vulcanizing each of the rubber compositions of Examples 1 to 13 and Comparative Examples 1 to 7 prepared by the method described above by means of an oil hydraulic press at 160° C. for 30 minutes. After each test specimen was stored in a Geer oven at 160° C. for 72 hours, the permanent compression set thereof was determined according to JIS K6262. The results above are summarized in the following Tables 3 and 4.

TABLE 3

| | | | Example | | | | | | | | | | |
|---|---|---|---|---|---|---|---|---|---|---|---|---|---|
| | | | 1 | 2 | 3 | 4 | 5 | 6 | 7 | 8 | 9 | 10 |
| Tensile properties | | Elongation at break EB (%) | 783 | 775 | 750 | 821 | 830 | 774 | 695 | 712 | 774 | 800 |
| | | Hardness HS (–) | 55 | 53 | 56 | 57 | 58 | 54 | 52 | 54 | 56 | 57 |
| Heat resistance | 160° C. × 48 hr Degradation in Geer oven | Elongation at break EB (%) | 707 | 715 | 650 | 740 | 580 | 722 | 597 | 575 | 688 | 729 |
| | | Hardness HS (–) | 64 | 65 | 69 | 66 | 72 | 63 | 69 | 68 | 65 | 63 |
| | 160° C. × 96 hr Degradation in Geer oven | Elongation at break EB (%) | 348 | 328 | 215 | 352 | 158 | 368 | 223 | 221 | 319 | 368 |
| | | Hardness HS (–) | 78 | 77 | 81 | 80 | 87 | 77 | 80 | 82 | 79 | 77 |
| | 160° C. × 144 hr Degradation in Geer oven | Elongation at break EB (%) | 138 | 135 | 70 | 139 | 30 | 153 | 81 | 67 | 130 | 140 |
| | | Hardness HS (–) | 87 | 85 | 91 | 89 | 92 | 84 | 90 | 92 | 89 | 87 |
| Permanent compression set | 160° C. × 48 hr | | 53 | 55 | 48 | 49 | 72 | 53 | 50 | 56 | 53 | 54 |

TABLE 4

| | | | Example | | | Comparative Example | | | | | | |
|---|---|---|---|---|---|---|---|---|---|---|---|---|
| | | | 11 | 12 | 13 | 1 | 2 | 3 | 4 | 5 | 6 | 7 |
| Tensile properties | | Elongation at break EB (%) | 770 | 782 | 728 | Unvulcanizable | 729 | 739 | 763 | 728 | 708 | 772 |
| | | Hardness HS (–) | 54 | 56 | 53 | | 58 | 56 | 54 | 57 | 53 | 58 |
| Heat resistance | 160° C. × 48 hr Degradation in Geer oven | Elongation at break EB (%) | 650 | 663 | 660 | | 304 | 412 | 407 | 472 | 345 | 442 |
| | | Hardness HS (–) | 70 | 67 | 63 | | 81 | 77 | 78 | 77 | 80 | 81 |
| | 160° C. × 96 hr Degradation in Geer oven | Elongation at break EB (%) | 220 | 270 | 302 | | 10 | 142 | 117 | 139 | 42 | 163 |
| | | Hardness HS (–) | 80 | 80 | 78 | | 93 | 88 | 88 | 89 | 91 | 92 |
| | 160° C. × 144 hr Degradation in Geer oven | Elongation at break EB (%) | 98 | 96 | 112 | | Unmeasurable by hardening | | | | | |
| | | Hardness HS (–) | 90 | 90 | 86 | | | | | | | |
| Permanent compression set | 160° C. × 48 hr | | 58 | 53 | 55 | | 48 | 58 | 59 | 56 | 60 | 56 |

As shown in Table 4 above, the rubber composition of Comparative Example 1, which contains the chloroprene rubber in a smaller amount, was not vulcanized adequately and could not be molded. On the other hand, the rubber composition of Comparative Example 2 is a rubber composition containing no elastomer, while that of Comparative Example 3 is a rubber composition containing zinc powder having an average diameter of more than 10 µm. Alternatively, the rubber composition of Comparative Example 4 is a rubber composition containing zinc powder in an amount of less than 3 parts by mass with respect to 100 parts by mass of the rubber component and the rubber composition of Comparative Example 5 is that containing zinc powder in an amount of more than 20 parts by mass.

Further, the rubber composition of Comparative Example 6 is a rubber composition containing magnesium oxide in an amount of less than 4 parts by mass with respect to 100 parts by mass of the rubber component and the rubber composition of Comparative Example 7 is that containing magnesium oxide in an amount of more than 16 parts by mass. The test specimens obtained by vulcanization of the rubber compositions of Comparative Examples 2 to 7 could not endure the heat-oxidation condition of 160° C. for 144 hours and hardened, prohibiting measurement of the elongation at break (EB).

In contrast, test specimens shown in Tables 3 and 4, which were obtained by vulcanization of the rubber compositions of Examples 1 to 13, did not vulcanize, retained their rubber elasticity, and showed favorable elongation at break (EB) and tensile properties, even if they were left under a temperature condition at 160° C. for 144 hours. The results above confirm that it is possible according to the present invention to obtain a rubber composition that gives a vulcanizate drastically improved in heat resistance without deterioration in permanent compression set.

It was possible to obtain tire bladders superior in heat resistance using the rubber compositions of Examples 1 to 13.

It was also possible to obtain automobile hoses superior in heat resistance, using the rubber compositions of Examples 1 to 13.

It was also possible to obtain antivibration rubbers superior in heat resistance, using the rubber compositions of Examples 1 to 13.

The invention claimed is:

1. A rubber composition, comprising
   a rubber component consisting of a chloroprene rubber: 50 to 90 mass % and ethylene-α-olefin copolymers: 10 to 50 mass % in a total amount of 100 parts by mass,
   a zinc powder having an arithmetic mean particle diameter, as determined by the method specified by JIS Z8901, of 3 to 10 µm in an amount of 3 to 20 parts by mass, and
   a magnesium oxide having a BET specific surface area, as determined by the one-point method specified by JIS Z8830, of 20 to 150 $m^2/g$ in an amount of 4 to 16 parts by mass.

2. The rubber composition according to claim 1, wherein the chloroprene rubber is a mercaptan- or xanthogen-modified chloroprene rubber.

3. The rubber composition according to claim 1, wherein the elastomer is an ethylene-propylene copolymer.

4. The rubber composition according to claim 1, further comprising at least one antioxidant agent selected from aromatic amine-based antioxidant agents, hindered phenol-based antioxidant agents, and phosphite-based antioxidant agents in a total amount of 3 to 10 parts by mass with respect to 100 parts by mass of the rubber component.

5. The rubber composition according to claim 1, further comprising an acetylene black having a nitrogen-adsorption specific surface area ($N_2SA$) of 50 to 160 $m^2/g$ in an amount of 10 to 50 parts by mass with respect to 100 parts by mass of the rubber component.

6. The rubber composition according to claim 1, further comprising at least one softener selected from the group consisting of vegetable oil-based softeners, ether-ester-based plasticizers, phthalate ester-based plasticizers, adipate ester-based plasticizers, dibasic aliphatic acid ester-based plasticizers, phosphate ester-based plasticizers, citrate ester-based plasticizers, and petroleum aromatic process oils in an amount of 5 to 20 parts by mass with respect to 100 parts by mass of the rubber component.

7. A vulcanizate, prepared by vulcanizing the rubber composition according to claim 1.

8. A molded article of the vulcanizate according to claim 7.

* * * * *